US006732151B1

(12) United States Patent
Tobias et al.

(10) Patent No.: US 6,732,151 B1
(45) Date of Patent: May 4, 2004

(54) METHODS FOR FORWARDING VOICE MESSAGES TO AN EMAIL ACCOUNT

(75) Inventors: Martin Tobias, Seattle, WA (US);
Beverley Kite, Seattle, WA (US);
Mathews Brown, Seattle, WA (US);
Eric Lindvall, Seattle, WA (US)

(73) Assignee: Loudeye Corp., Seattle, WA (US)

( * ) Notice: Subject to any disclaimer, the term of this patent is extended or adjusted under 35 U.S.C. 154(b) by 0 days.

(21) Appl. No.: 09/502,161

(22) Filed: Feb. 11, 2000

Related U.S. Application Data

(60) Provisional application No. 60/156,817, filed on Sep. 29, 1999, provisional application No. 60/120,209, filed on Feb. 11, 1999, provisional application No. 60/120,208, filed on Feb. 11, 1999, provisional application No. 60/120,207, filed on Feb. 11, 1999, provisional application No. 60/120,206, filed on Feb. 11, 1999, and provisional application No. 60/119,762, filed on Feb. 11, 1999.

(51) Int. Cl.[7] .............................................. G06F 15/16
(52) U.S. Cl. ....................... 709/206; 709/207; 709/246; 379/88.17; 713/202
(58) Field of Search ................................. 709/206, 207, 709/246, 249; 370/401, 428; 379/88.12, 88.13, 88.14, 88.16, 88.17, 88.18, 88.24, 88.25; 713/200, 201, 202

(56) References Cited

U.S. PATENT DOCUMENTS

| | | | | |
|---|---|---|---|---|
| 5,647,002 A | * | 7/1997 | Brunson | 709/206 |
| 5,737,395 A | * | 4/1998 | Irribarren | 379/88.13 |
| 5,802,150 A | * | 9/1998 | Beck et al. | 379/93.06 |
| 6,085,231 A | * | 7/2000 | Agraharam et al. | 709/206 |
| 6,212,550 B1 | * | 4/2001 | Segur | 709/206 |
| 6,295,552 B1 | * | 9/2001 | Shibata | 709/206 |
| 6,304,573 B1 | * | 10/2001 | Hicks, III | 370/401 |
| 6,385,306 B1 | * | 5/2002 | Baxter, Jr. | 379/88.13 |
| 6,411,696 B1 | * | 6/2002 | Iverson et al. | 379/201.06 |
| 6,483,899 B2 | * | 11/2002 | Agraharam et al. | 379/88.14 |

OTHER PUBLICATIONS

"Dialogic Product Information—TellSoft," http://www-.tellsoft.com/dialogic, retrieval date Feb. 12, 2000.
"iTalk Email Solution—TellSoft," http:/www.tellsoft.com/solutions/email.asp, retrieval date Feb. 12, 2000.
"iTalk Server—TellSoft," http:/www.tellsoft.com/italk, retrieval date Feb. 12, 2000.
"iTalk Live Encoding (LE) Server—TellSoft," hhtp:/www-.tellsoft.com/italkle, retrieval date Feb. 12, 2000.

* cited by examiner

*Primary Examiner*—Mehmet B. Geckil
(74) *Attorney, Agent, or Firm*—Shaw Pittman LLP

(57) ABSTRACT

A method and system forwarding voice messages to an email account is disclosed. According to one method, a voice message that is associated with a particular user is retrieved from a voice mail system. The voice message is then encoded into a streaming media file and automatically forwarded in an email message to one or more email addresses. According to another method, a voice message is converted into a text file and automatically forwarded in an email message to one or more email addresses.

9 Claims, 2 Drawing Sheets

METHODS FOR FORWARDING VOICE MESSAGES TO AN EMAIL ACCOUNT

This patent application claims priority from,

U.S. Provisional Patent Application No. 60/119,762, filed on Feb. 11, 1999, entitled PRODUCTION SYSTEM FOR DIGITALLY ENCODING INFORMATION;

U.S. Provisional Patent Application No. 60/120,209, filed on Feb. 11, 1999, entitled MEDIA DISTRIBUTION SYSTEM;

U.S. Provisional Patent Application No. 60/120,207, filed on Feb. 11, 1999, entitled SYSTEM FOR REMOTE PREFORMANCE OF DIGITAL ENCODING;

U.S. Provisional Patent Application No. 60/120,206, filed on Feb. 11, 1999, entitled DIGITAL VCR;

U.S. Provisional Patent Application No. 60/120,208, filed on Feb. 11, 1999, entitled SYSTEM FOR HANDLING VOICE MAIL IN AN E-MAIL SYSTEM; and U.S. Provisional Patent Application No. 60/156,817, filed on Sep. 29, 1999, entitled STREAMING MEDIA ENCODING AGENT FOR TEMPORAL MODIFICATIONS;

the content of which are hereby incorporated by reference in their entirety.

FIELD OF THE INVENTION

The present invention generally relates to computer systems, and more specifically to a system for converting voice messages to emails.

BACKGROUND OF THE INVENTION

With the advancement of today's technology, individuals are provided with many mechanisms for communicating between one another. For example, if Mr. Smith would like to communicate with Mr. Jones, he can pickup the telephone and place a call to Mr. Jones. If Mr. Jones is unavailable, an answering service, for example voice mail, will typically be available to allow Mr. Smith to leave a message for Mr. Jones.

Alternatively, if both Mr. Smith and Mr. Jones have access to email accounts, Mr. Smith may communicate with Mr. Jones by sending an email message to his email account. Thereafter, Mr. Jones can retrieve to email message and respond appropriately.

However, checking multiple areas of communication is a hassle and often results in dropped responses, and confused priorities. Thus, although the multitude of different communication mechanism provide users with many options for communicating, in certain situations the availability of different communication mechanism may actually delay or hinder how two individuals communicate. For example, suppose Mr. Smith would like to offer tickets to Mr. Jones for a sporting event that begins at 5:00 pm. Mr. Smith may call Mr. Jones at home to inform him that if he wants the tickets he must let Mr. Smith know by 3:00 pm, otherwise he intends to offer the tickets to someone else. However, even if Mr. Jones is currently working at the office on his computer, because Mr. Smith used a communication mechanism (the telephone) that is different than the communication mechanism that Mr. Jones was monitoring (an email account), if Mr. Jones does not return home until 4:00 pm, even if Mr. Jones would have like to have taken the tickets, he will have most likely missed out.

Based on the foregoing, it is clearly desirable to provide a mechanism for communicating between different communication mechanisms.

It is also desirable to provide a mechanism for reducing the need of checking multiple areas of communication.

SUMMARY OF THE INVENTION

The present invention comprises, in one aspect, a method for forwarding voice messages to an email account, including the steps of: retrieving a voice message from a voice mail system, wherein the voice message is associated with a particular user; encoding the voice message into a streaming media file; and automatically forwarding the streaming media file in an email message to one or more email addresses, wherein the one or more email addresses are associated with the particular user.

According to another aspect, a method for forwarding voice messages to an email account, including the steps of: retrieving a voice message from a voice mail system, wherein the voice message is associated with a particular user; converting the voice message into a text file; and automatically forwarding the text file in an email message to one or more email addresses, wherein the one or more email addresses are associated with the particular user.

The invention also encompasses a computer-readable medium, and an apparatus configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

An automated system for retrieving, encoding and publishing voice mail messages to e-mail systems is disclosed. In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Context Overview

A voice to email mechanism is provided that automatically retrieves, encodes and transforms voice mail into email file attachments. In one embodiment, voice mail messages are retrieved, encoded and transformed into streaming media email file attachments. In another embodiment, voice mail messages are retrieved, decoded and transformed into text e-mail file attachments. The attachments, text or streaming media email attachments, may then be automatically forwarded to one or more designated email accounts.

For example, by integrating specialized software with PBX hardware, low bandwidth streaming media versions of the original messages can be captured and "pushed" to users via standard e-mail protocols.

System Functionality

Figure 1:
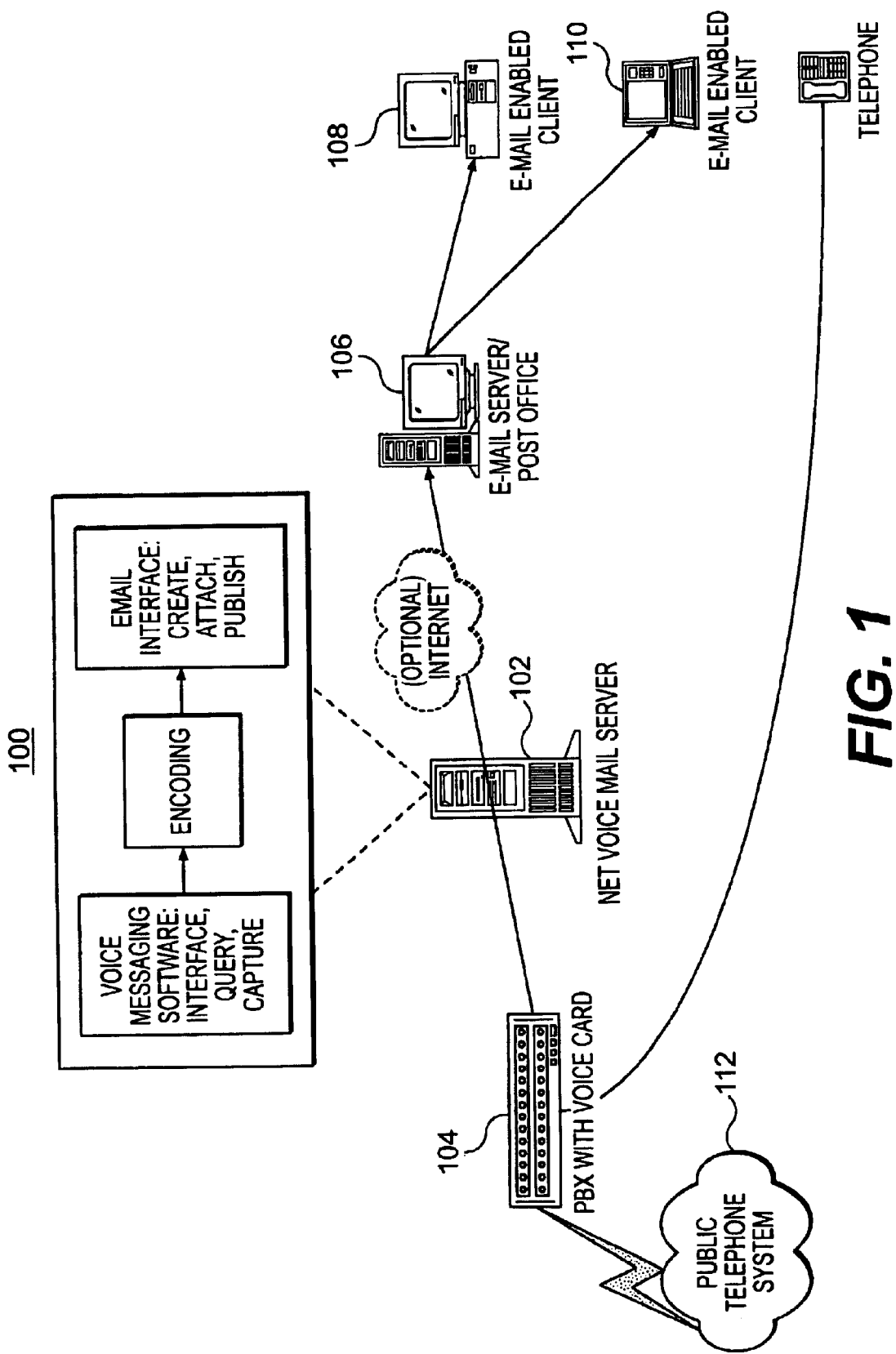
FIG. 1 is a block diagram of a voice to email system in which certain embodiments of the invention may be used.

FIG. 1 is a block diagram of a voice to email system 100 in which certain embodiments of the invention may be used. As depicted, system 100 includes a server 102, which is connected between a user's voice mail system (for example a PBX system) 104 and the user's email system 106. In one embodiment, the server 102 makes periodic (configurable) calls to the user's voice mail system 104, and performs the necessary retrieval of messages. Thereafter, the messages are captured in a digital format and then converted into streaming files using industry available compression/decompression technology. Once the streaming media file is created, it is then forwarded in an email message to the user's email system 106. The user may then interact with a client 108,110 to retrieve the email message and to play the streaming media email attachment.

To retrieve the voice messages from the user's voice mail system 104, server 102 may be configured to check or poll specific mail boxes. In certain embodiments, server 102 is configured to understand the specific protocols or key sequences that are required to check and retrieve message from the different mail boxes and mailbox areas. In one embodiment, server 102 maintains a list of one or more passwords that allows the server to access voice boxes that password protected.

In one embodiment, the voice mail system 104 comprises a PBX system that includes a Dialogic or equivalent voice board. The system 102 may include Java based interface software that can be used for retrieval and conversion of messages to streaming media. By maintaining a mapping of voice mail boxes to email addresses, server 102 can identify the specific email address for sending an email message.

In one embodiment, the voice mail system 104 includes a speech recognition unit or module that is configured to convert analog or digital voice patterns into text. By converting analog or digital voice patterns into text, text files may be generated that correspond to a voice message that was previously left on the voice mail system 104. The text file may then be included within an email message and automatically forwarded to the appropriate email address. As such, individuals owning email accounts may obtain a text version of their voice messages, thus reducing the inconvenience and hassle of having to call into their message center.

Hardware Overview

Figure 2:
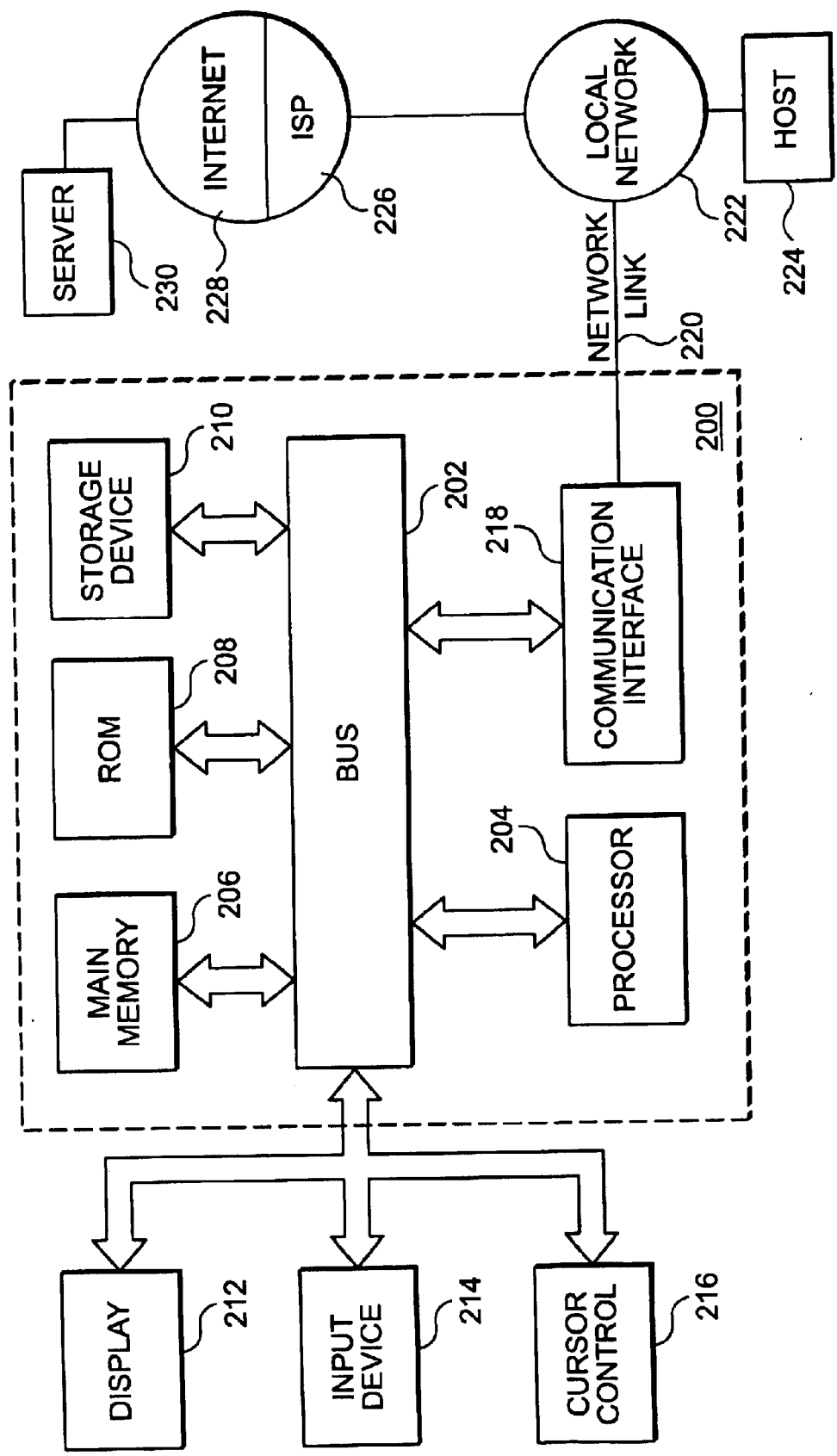
FIG. 2 is a block diagram of another computer system architecture upon which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for automatically forwarding voice messages to an email account. According to one embodiment of the invention, a voice to email system is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector coupled to bus 202 can receive the data carried in the infrared signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for automatically forwarding voice messages to an email account as described herein.

The received code may be executed by processor 204 as it is received, and/or stored in storage device 210, or other non-volatile storage for later execution. In this manner, computer system 200 may obtain application code in the form of a carrier wave.

Alternatives, Extensions

The voice to email mechanism that is described herein provides an automated system for forwarding voice messages to an email account. As explained, by retrieving a voice message, encoding the message in either a text or streaming media attachment, and automatically forwarding the attachment in an email message, a mechanism is provided for communicating between to separate different communication system. Thus, individuals are relieved of the inconvenience and burden of checking multiple communication devices.

In describing certain embodiments of the invention, several drawing figures have been used for explanation purposes. However, the invention is not limited to any particular context as shown in drawing figures. Thus, embodiments of the invention may include one or more of the components actually being configured to execute on a single computer unit or system. Thus, embodiments of the invention are not limited to any particular method of encoding or receiving encoded media content. As such, the specification and drawings should be viewed in an illustrative rather than a restrictive sense.

In addition, in this disclosure, including in the claims, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Thus, embodiments of the invention are only limited by the following claims.

What is claimed is:

1. A method for forwarding voice messages to an email account, comprising:

maintaining a plurality of passwords associated with a plurality of voice mail boxes that are password protected, wherein the plurality of voice mail boxes are associated with a voice mail system;

retrieving a voice message from one of the plurality of voice mail boxes by providing a password that is associated with the respective voice mail box, wherein the voice message is associated with a particular user;

encoding the voice message into a streaming media file; and automatically forwarding the streaming media file in an email message to one or more email addresses, wherein the one or more email addresses are associated with the particular user.

2. The method of claim 1, further comprising using specific protocols that are required to check and retrieve messages from the one of the plurality of voice mail boxes.

3. The method of claim 2, further comprising associating specific protocols for retrieving messages from the voice mail box with the password for the voice mail box.

4. The method of claim 1, further comprising using specific key sequences that are required to check and retrieve messages from the one of the plurality of voice mail boxes.

5. A method for forwarding voice messages to an email account, comprising:

maintaining a plurality of passwords associated with a plurality of voice mail boxes that are password protected, wherein the plurality of voice mail boxes are associated with a voice mail system;

retrieving a voice message from one of the plurality of voice mail boxes by providing a password that is associated with the respective voice mail box, wherein the voice message is associated with a particular user;

converting the voice message into a text file; and automatically forwarding the text file in an email message to one or more email addresses, wherein the one or more email addresses are associated with the particular user.

6. The method of claim 5, further comprising using specific protocols that are required to check and retrieve messages from the one of the plurality of voice mail boxes.

7. The method of claim 6, further comprising associating specific protocols for retrieving messages from the voice mail box with the password for the voice mail box.

8. The method of claim 5, further comprising using specific key sequences that are required to check and retrieve messages from the one of the plurality of voice mail boxes.

9. A method for forwarding voice messages to an email account, comprising:

associating a password with a voice mail box that is password protected within a voice mail system;

associating specific protocols for retrieving messages from the voice mail box with the password;

accessing the voice mail box using the password;

retrieving a voice message from the voice mail box using the specific protocols;

encoding the voice message into one of a streaming media file and a text file; and automatically forwarding the one of the streaming media file and the text file in an email message to one or more email addresses, wherein the one or more email addresses are associated with a particular user associated with the voice mail box.

\* \* \* \* \*